United States Patent
Wang et al.

(10) Patent No.: US 9,904,956 B2
(45) Date of Patent: Feb. 27, 2018

(54) IDENTIFYING PAYMENT CARD CATEGORIES BASED ON OPTICAL CHARACTER RECOGNITION OF IMAGES OF THE PAYMENT CARDS

(71) Applicant: GOOGLE INC., Mountain View, CA (US)

(72) Inventors: Xiaohang Wang, Jersey City, NJ (US); Glenn Berntson, Jersey City, NJ (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 14/551,991

(22) Filed: Nov. 24, 2014

(65) Prior Publication Data

US 2016/0019530 A1    Jan. 21, 2016

Related U.S. Application Data

(60) Provisional application No. 62/024,838, filed on Jul. 15, 2014.

(51) Int. Cl.
*G06Q 40/00* (2012.01)
*G06Q 20/34* (2012.01)
(Continued)

(52) U.S. Cl.
CPC ......... *G06Q 40/00* (2013.01); *G06K 9/00442* (2013.01); *G06K 9/18* (2013.01);
(Continued)

(58) Field of Classification Search
CPC ........... G06K 9/00469; G06K 2209/01; G06K 9/00456
See application file for complete search history.

(56) References Cited

U.S. PATENT DOCUMENTS 6,722,574 B2    4/2004   Skantze et al.
8,588,528 B2   11/2013   Chapman et al.
(Continued)

FOREIGN PATENT DOCUMENTS

AU    2013100314 A4    4/2013
WO   2014/210576 A2   12/2014

OTHER PUBLICATIONS

U.S. Appl. No. 14/059,071 to Kumar et al. filed Oct. 21, 2013.
(Continued)

*Primary Examiner* — Christopher Stanford
(74) *Attorney, Agent, or Firm* — Johnson, Marcou & Isaacs, LLC

(57) ABSTRACT

A user captures an image of a payment card via a user computing device camera. An optical character recognition system receives the payment card image from the user computing device. The system performs optical character recognition and visual object recognition algorithms on the payment card image to extract text and visual objects from the payment card image, which are used by the system to identify a payment card type. The system may categorize the payment card as a credit card or a non-credit card. In an example embodiment, the system determines that the payment card type is a credit card and transmits fee structure to the user. The user selects a second payment card for use in the transaction and the transaction is processed using financial account information associated with the second payment card.

14 Claims, 6 Drawing Sheets

(51) Int. Cl.
*G06K 9/00* (2006.01)
*G06K 9/18* (2006.01)
*G06Q 20/36* (2012.01)
*G06K 9/32* (2006.01)
*H04N 5/225* (2006.01)

(52) U.S. Cl.
CPC .......... *G06K 9/3258* (2013.01); *G06Q 20/34* (2013.01); *G06Q 20/351* (2013.01); *G06Q 20/36* (2013.01); *H04N 5/2257* (2013.01); *G06K 2209/01* (2013.01)

(56) References Cited

U.S. PATENT DOCUMENTS

| | | | |
|---|---|---|---|
| 8,644,611 | B2 | 2/2014 | Natarajan et al. |
| 8,831,329 | B1 | 9/2014 | Kumar et al. |
| 8,942,420 | B2 | 1/2015 | Lee et al. |
| 8,995,741 | B2 | 3/2015 | Kumar et al. |
| 9,070,183 | B2 | 6/2015 | Kumar et al. |
| 9,213,907 | B2 | 12/2015 | Kumar et al. |
| 9,235,771 | B2 | 1/2016 | Rowley et al. |
| 9,262,682 | B2 | 2/2016 | Kumar et al. |
| 9,342,830 | B2 | 5/2016 | Wang et al. |
| 2004/0057619 | A1 | 3/2004 | Lim et al. |
| 2004/0117302 | A1* | 6/2004 | Weichert et al. ............... 705/40 |
| 2006/0230004 | A1 | 10/2006 | Handley |
| 2006/0251338 | A1 | 11/2006 | Gokturk et al. |
| 2007/0127825 | A1 | 6/2007 | Ivanov |
| 2007/0142035 | A1 | 6/2007 | Lee |
| 2008/0056572 | A1 | 3/2008 | Nielsen |
| 2008/0063276 | A1 | 3/2008 | Vincent et al. |
| 2008/0143880 | A1 | 6/2008 | Jung et al. |
| 2008/0177730 | A1 | 7/2008 | Endo et al. |
| 2008/0298635 | A1 | 12/2008 | West |
| 2009/0028443 | A1 | 1/2009 | Chen et al. |
| 2009/0060396 | A1 | 3/2009 | Blessan et al. |
| 2010/0054585 | A1 | 3/2010 | Guillou et al. |
| 2010/0310172 | A1 | 12/2010 | Natarajan et al. |
| 2011/0170768 | A1 | 7/2011 | Alldrin et al. |
| 2012/0099780 | A1 | 4/2012 | Smith et al. |
| 2012/0140996 | A1 | 6/2012 | Hara et al. |
| 2012/0143760 | A1 | 6/2012 | Abulafia et al. |
| 2012/0179558 | A1* | 7/2012 | Fischer .................. G06Q 20/20 705/16 |
| 2012/0233073 | A1 | 9/2012 | Salmon et al. |
| 2012/0239542 | A1 | 9/2012 | Preston et al. |
| 2013/0004076 | A1 | 1/2013 | Koo et al. |
| 2013/0060786 | A1 | 3/2013 | Rodriguez-Serrano et al. |
| 2013/0100314 | A1 | 4/2013 | Li et al. |
| 2013/0114890 | A1 | 5/2013 | Saund |
| 2013/0179245 | A1* | 7/2013 | Simonoff ........... G06Q 30/0222 705/14.23 |
| 2013/0182909 | A1 | 7/2013 | Rodriguez-Serrano |
| 2013/0195376 | A1 | 8/2013 | Baheti et al. |
| 2014/0043492 | A1 | 2/2014 | Geiger et al. |
| 2014/0122479 | A1 | 5/2014 | Panferov et al. |
| 2014/0244493 | A1* | 8/2014 | Kenyon et al. ................. 705/41 |
| 2014/0334721 | A1 | 11/2014 | Leverington et al. |
| 2015/0110362 | A1 | 4/2015 | Amtrup et al. |
| 2015/0127476 | A1 | 5/2015 | Skiba et al. |
| 2015/0254519 | A1 | 9/2015 | Kumar et al. |
| 2015/0294437 | A1 | 10/2015 | Manno et al. |
| 2016/0063325 | A1 | 3/2016 | Kumar et al. |
| 2016/0239911 | A1 | 8/2016 | Wang et al. |

OTHER PUBLICATIONS

U.S. Appl. No. 14/059,108 to Kumar et al. filed Oct. 21, 2013.
U.S. Appl. No. 14/091,093 to Rowley et al. filed Nov. 26, 2013.
U.S. Appl. No. 14/551,883 to Wang et al. filed Nov. 24, 2014.
Datta, "Credit Card Processing Using Cell Phone Images", Department of Electrical Engineering, Stanford University,, Jan. 1, 2011, 1-7.
Desire, "Office Action issued in copending U.S. Appl. No. 14/059,151, filed Oct. 21, 2013", dated Jan. 13, 2014, 1-10.
Desire, "Office Action issued in copending U.S. Appl. No. 14/461,001, filed Aug. 15, 2014", dated Oct. 2, 2014, 1-6.
Jacob, "Identification Numbers and Check Digit Algorithms", www.codeproject.com/Articles/459507/Identification-numbers-and-check-digit-algorithms, Sep. 20, 2012, 1-11.
Unknown, "TVCG Submission—Video Snapshots: Creating High-Quality Images from Video Clips", web: http://www.eecs.harvard.edu/~kalyans/research/snapshots/supplementary/results.html, May 18, 2013, 1-17.
Unknown, "Understanding Optical Character Recognition (OCR)", www.adcnordic.com/news/ocr.php, Jan. 1, 2002, 1-7.
Arica, et al., "Optical Character Recognition for Cursive Handwriting", IEEE Transactions on Pattern Analysis and Machine Intelligence, vol. 24, No. 6, Jun. 2002, 801-813.
Baran, et al., "transOptic, An Android OCR System", 18-551 Digital Communications & Signal Processing Systems Design, Spring 2012, May 9, 2012, 1-36.
Hossain, "Rapid Feature Extraction for Optical Character Recognition", Manuscript Draft—(Partially supported by the Independent University of Bangladesh), Jun. 4, 2012, 1-5.
Patel, "Office Action issued in co-pending U.S. Appl. No. 14/049,071, filed Oct. 21, 2013", dated Feb. 25, 2015, 1-12.
Unknown, "Patrial International Search Report issued in International Application No. PCT/US2014/044757", dated Mar. 12, 2012, 1-4.
Bauer, "International Search Report and Written Opinion issued in International Application No. PCT/US2014/044757", dated May 29, 2015, 1-16.
Desire, "Office Action issued in copending U.S. Appl. No. 14/645,410, filed Mar. 11, 2015", dated May 7, 2015, 1-7.
Mohri, "International Preliminary Report on Patentability issued in International Application No. PCT/US2014/044757", dated Jan. 7, 2016, 11 pages.
Marshall, "U.S. Office Action issued in copending U.S. Appl. No. 15/139,295, filed Apr. 26, 2016", dated May 18, 2016, 6 pages.
Cevikalp, et al., "Efficient Object Detection Using Cascades of Nearest Convex Model Classifiers", IEEE, 978-1-46773-8, 2012, pp. 3138-3145.
Duong, et al., "Cascade Classifier: Design and Application to Digit Recognition", IEEE, 1520-5263, 2005, 5 pages.
Patel, "U.S. Office Action issued in copending U.S. Appl. No. 14/722,123, filed May 26, 2015", dated Aug. 9, 2016, 7 pages.
Patel, "U.S. Office Action issued in copending U.S. Appl. No. 14/934,983, filed Nov. 6, 2015", dated Apr. 18, 2017, 15 pages.
Patel, "U.S. Office Action issued in copending U.S. Appl. No. 14/934,983, filed Nov. 6, 2015", dated Oct. 23, 2017, 8 pages.

* cited by examiner

IDENTIFYING PAYMENT CARD CATEGORIES BASED ON OPTICAL CHARACTER RECOGNITION OF IMAGES OF THE PAYMENT CARDS

RELATED APPLICATION

This patent application claims priority under 35 U.S.C. § 119 to U.S. Patent Application No. 62/024,838, filed Jul. 15, 2014, and entitled "Categorizing Payment Cards Based on Optical Character Recognition of Images of the Payment Cards." The entire contents of the above-identified application are hereby fully incorporated herein by reference.

TECHNICAL FIELD

The present disclosure relates generally to improving the process of categorizing payment cards based on optical character recognition of images of the cards.

BACKGROUND

User computing device applications can be used to store payment information associated with payment cards for use in transactions. Merchants generally must pay a transaction fee with certain types of payment cards, such as credit cards. For example, merchants may have to pay a percentage of the total transaction amount as a fee for processing a credit card. Debit cards, on the other hand, may carry a cheaper transaction processing fee than credit cards. Categories of payment cards, including credit cards and non-credit cards, may be identifiable based on design characteristics of payment cards. Conventional technologies do not distinguish between fees applicable to credit cards or non-credit cards and do not adjust transaction processing based on associated fees.

SUMMARY

In certain example aspects, computer-implemented methods to categorize payment information as credit or non-credit for saving in a digital wallet based on optical text recognition and object recognition of captured images of payment cards are provided. In an example embodiment, an optical character recognition ("OCR") system receives a payment card image from a user computing device and performs OCR and visual object recognition algorithms on the payment card image to extract text and visual objects from the payment card image. For each of the extracted visual objects, the OCR system retrieves a corresponding text description and, based on the extracted text and text descriptions of extracted visual objects, the OCR system identifies a payment card type. The OCR system categorizes the payment card as a credit card or a non-credit card. The OCR system notifies the user of the payment card category and applicable fees associated with payment card when a user selects the payment card for use in a transaction.

In certain other example aspects described herein, systems and a computer program products to categorize payment information as credit or non-credit for saving in a digital wallet based on optical text recognition and object recognition of captured images of payment cards are provided.

These and other aspects, objects, features, and advantages of the example embodiments will become apparent to those having ordinary skill in the art upon consideration of the following detailed description of illustrated example embodiments.

DETAILED DESCRIPTION OF EXAMPLE EMBODIMENTS

Overview

Figure 1:
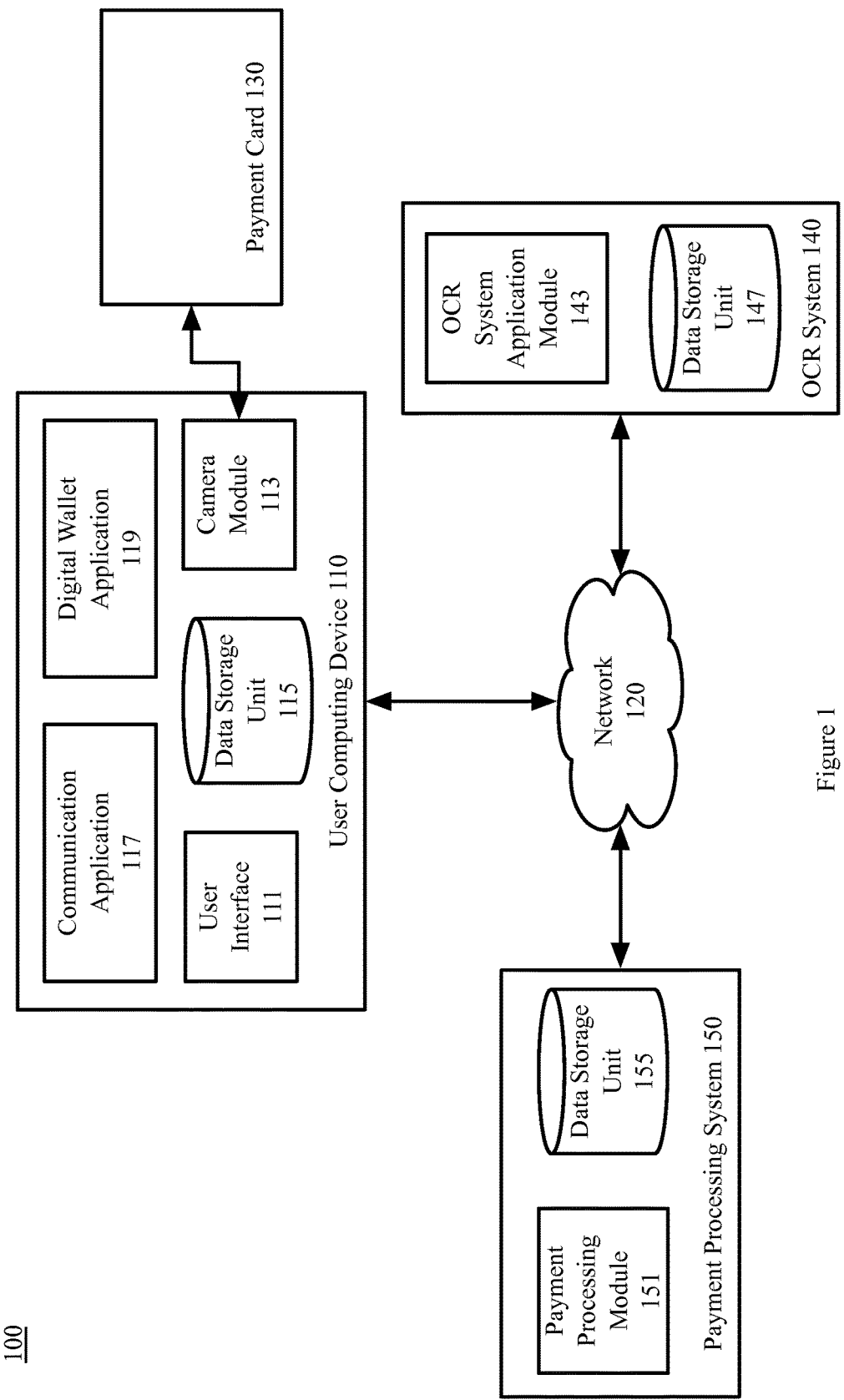
FIG. 1 is a block diagram depicting a system for determining categories for payment card information determined by optical character recognition of received payment card images, in accordance with certain example embodiments.

The example embodiments described herein provide computer-implemented techniques for determining categories for payment card information determined by optical character recognition of received payment card images. In an example embodiment, a user captures an image of a payment card via a user computing device camera. An optical character recognition ("OCR") system receives the payment card image from the user computing device. The OCR system performs OCR and visual object recognition algorithms on the payment card image to extract text and visual objects from the payment card image. For each of the extracted visual objects, the OCR system retrieves a corresponding text description. Based on the extracted text and text descriptions of extracted visual objects, the OCR system identifies a payment card type. In an example embodiment, the OCR system categorizes the payment card as a credit card or a non-credit card.

In an example embodiment, a user selects a digital wallet application on a user computing device. In an example embodiment, the digital wallet application on the user computing device is associated with a payment processing system and communicates with the payment processing system. In this example, the user may register with the payment processing system to create a digital wallet account and may download the digital wallet application onto the user computing device. In an example embodiment, the digital wallet application stores payment account information associated with the user for use in transactions. The user selects an option to add a new payment card to the digital wallet application. An example payment card comprises a credit card, a debit card, a stored value card or other gift card, a coupon, a voucher card, a rewards points card, a loyalty card, or other card appropriate for use in a transaction. In this example, a transaction may comprise a purchase, exchange, return, or redemption of goods or services and may comprise transfers of funds, credits, points, or any other appropriate unit of value to or from a user financial account associated with a corresponding payment card.

The user computing device camera module is activated. In an example embodiment, the digital wallet application activates a camera module resident on the user computing device in response to the user selecting an option to add a new payment card to the digital wallet application. In this example embodiment, the camera module communicates with the user computing device, which comprises a camera device. In another example embodiment, a camera device is separate from the user computing device and communicates with the user computing device over a network. In another example embodiment, the user activates the camera module manually by actuating an object on the user interface of the user computing device. The user captures an image of the payment card. In an example embodiment, the user actuates an interface object on the user computing device to capture the image of the payment card. In this example embodiment, the user captures an image of the front side of the payment card, an image of the back side of the payment card, or multiple images of both the front side and the back side of the payment card. For example, the digital wallet application displays a live stream of the camera feed to enable the user to aim the camera module or camera device to capture an adequate image of the payment card. In this example, the user positions the payment card and/or the user computing device within a viewing area displayed by the user computing device and actuates an object on the user interface to capture the image of the payment card. For example, the user touches a "take picture" interface object on a touch screen interface of the user computing device to take a picture of the payment card. In another example embodiment, the user captures multiple images of the payment card and the digital wallet application selects one of the multiple images.

The image or images of the payment card are transmitted by the user computing device to an optical character recognition ("OCR") system. In an example embodiment, some, or all, of the functions of the OCR application may be performed by an OCR system application module. In another example embodiment, some or all of the functions attributed to as being performed by the OCR system may be performed by the user computing device. For example, instead of transmitting the captured image of the payment card to the OCR system, the user computing device may perform character and image recognition on the captured image. In an example embodiment, the OCR system application module, the user computing device camera module, the user computing device, or other computing device performs blur detection on the image. For example, the image may be recognized as blurry, overly bright, overly dark, or otherwise obscured in a manner that prevents a high resolution image from being obtained. In this example embodiment, the appropriate device may adjust the image capturing method to reduce the blur in the image. For example, the OCR system may transmit a request to the user computing device instructing the camera module to adjust the focus on the payment card, instructing the user to move the camera device or user computing device comprising a camera device closer to or farther away from the payment card, or any other appropriate instruction. In this example, the user captures a subsequent image of the payment card using the user computing device or camera device and the user computing device transmits the subsequent image to the OCR system. In another example, the user computing device, digital wallet application residing on the user computing device, or camera module residing on the user computing device may request that the camera module and/or the user perform similar actions to receive a subsequent image to transmit to the OCR system.

In another example embodiment, the OCR system application module may perform a digital image manipulation or any other suitable method to remove a blur in the image. In an example embodiment, the OCR system application module isolates the image of the payment card from the received image using image data manipulation or image extraction techniques. For example, the received image may comprise an image of a payment card taken on the background of a kitchen table. In this example, the OCR system application module isolates and extracts the image of the payment card from the background image of the table to create an image comprising only the payment card. In some example embodiments, the OCR system application module received images comprising images of the front and back of the payment card. In these example embodiments, the OCR system application module may isolate and extract the images of the front and back sides of the payment card to create a combined image comprising only the payment card.

The OCR system extracts text from the image of the payment card. In an example embodiment, the OCR system application module applies an OCR algorithm to the card image to identify the information on the card. The OCR algorithm may represent any suitable process, program, method, or other manner of recognizing the digits or characters represented on the card image. In an example embodiment, the OCR algorithm may be customized to look for characters in particular locations on the image of the payment card, to look for a certain number of characters, or to look for certain combinations of characters. For example, it may be an industry standard for certain types of payment cards to have 15 or 16 numerical digits in a certain location on the payment card. In an example embodiment, the OCR system application module identifies each character and categorizes the groups of characters. For example, the OCR system application module may determine that a group of characters comprise a name, account number, expiration date, and other suitable categories of data.

The OCR system extracts visual objects from the image of the payment card. The OCR system application module may use any suitable algorithm, process, method, or other manner of recognizing card images. For example, the OCR system application module may isolate visual objects, such as card art, within the image of the card and can compare the visual object images to a stored database of images to identify matching images. The OCR system retrieves a text description of extracted visual objects. For example, when the OCR system compares the identified visual object to a database of images and locates a matching image, the OCR system accesses stored data associated with the matching image. The data stored with the matching images may include an identification of the payment card type. For example, the OCR system may identify a logo on the card image that matches a logo in the database and retrieve a text description from the database that identifies the logo as pertaining to a particular bank, merchant system, issuer system, acquirer system, or other appropriate system.

In certain example embodiments, the user initiates a digital wallet transaction. For example, the user accesses a website associated with a payment processing system using the user computing device, selects another user with whom to initiate a payment transfer, and selects an amount to transfer. In an example embodiment, the user selects an option to pay using the digital wallet application associated with the payment processing system. The digital wallet application presents the user with a list of saved payment cards, the saved payment cards comprising saved images of payment cards captured by the user computing device camera module or other capture device. In an example embodiment, the user is presented with images of each of the payment cards in the payment card list for selection. For example, the list of saved payment cards may comprise one or multiple debit cards, credit cards, loyalty cards, rewards cards, coupon cards, gift cards or other stored value cards, or other payment cards entered by the user, depending on the configurations of the digital wallet application.

The user selects a payment card. In an example embodiment, the user actuates an object on the user interface of the user computing device to select the payment card. For example, the user touches an image of the payment card on a touchscreen user interface to select the payment card. In another example, the user captures an image of a payment card for use in the transaction. In this example, the user may select an option on the digital wallet application to capture the image of the payment card. In an example embodiment, the digital wallet application transmits one or multiple saved or captured images associated with the selected payment card to the OCR system application module for text and image recognition. In another example embodiment, the digital wallet application has previously sent an image of the payment card to the OCR system and received payment information associated with the payment card image from the OCR system.

In an example embodiment, based on the text description of recognized visual objects and extracted text from the payment card image, the OCR system identifies the payment card type. For example, the OCR system identifies the payment card as a debit card, a credit card, a gift card or other stored value card, or other appropriate category of payment card. In this example, the OCR system may also identify a merchant system, financial institution, issuer system, and/or acquirer system associated with the payment card. The OCR system retrieves a fee structure associated with the identified payment card. In an example embodiment, the OCR system communicates with a payment processing system to request and receive the fee structure. In another example embodiment, the OCR system is a component of a payment processing system and has access to the fee structure. In this example embodiment, the OCR system accesses a data storage unit to retrieve the fee structure.

The digital wallet application advises the user of transaction fees associated with the payment card. For example, the transaction fees for a credit card may be higher than the transaction fees for other types of payment cards. In an example embodiment, the user may then confirm the selection of the payment card for use in the transaction, select a subsequent payment card to use for the transaction, or cancel the transaction. If the OCR system does not identify the payment card as a credit card, the OCR system allows the user to enter transaction details and initiate the transaction directly without confirming a selection of the payment card. For example, the OCR system identifies the payment card as a debit card and transmits payment information associated with the payment card and a notification to the digital wallet application notifying the digital wallet application that the payment card is a debit card. In this example, the user may enter a transaction amount or other transaction details and actuate an object on the user interface of the user computing device to confirm the transaction. The transaction is processed by the payment processing system.

By using and relying on the methods and systems described herein, an OCR system may categorize payment cards as credit cards or debit cards for saving in a digital wallet account based optical text recognition and object recognition of captured images of payment cards. Additionally, by receiving a categorization of the payment cards from the OCR system, a payment processing system associated with a user's digital wallet account may assist the user in avoiding the selection a payment card with a high transaction fee for use in a transaction.

Example System Architecture

Turning now to the drawings, in which like numerals indicate like (but not necessarily identical) elements throughout the figures, example embodiments are described in detail.

FIG. 1 is a block diagram depicting a system 100 for determining categories for payment card information determined by optical character recognition of received payment card images, in accordance with certain example embodiments. As depicted in FIG. 1, the system 100 includes network computing systems 110, 140, and 150 that are configured to communicate with one another via one or more networks 120. In some embodiments, a user associated with a device must install an application and/or make a feature selection to obtain the benefits of the techniques described herein.

The network 120 can include a local area network ("LAN"), a wide area network ("WAN"), an intranet, an Internet, storage area network ("SAN"), personal area network ("PAN"), a metropolitan area network ("MAN"), a wireless local area network ("WLAN"), a virtual private network ("VPN"), a cellular or other mobile communication network, Bluetooth, Bluetooth low energy, near field communication ("NFC"), Wi-Fi, or any combination thereof or any other appropriate architecture or system that facilitates the communication of signals, data, and/or messages. Throughout the discussion of example embodiments, it should be understood that the terms "data" and "information" are used interchangeably herein to refer to text, images, audio, video, or any other form of information that can exist in a computer-based environment.

Each network computing device 110, 140, and 150 includes a device having a communication module capable of transmitting and receiving data over the network 120. For example, each network computing device 110, 140, and 150 can include a server, desktop computer, laptop computer, tablet computer, a television with one or more processors embedded therein and/or coupled thereto, smart phone, handheld computer, personal digital assistant ("PDA"), or any other wired or wireless, processor-driven device. In the example embodiment depicted in FIG. 1, the network computing devices 110, 140, and 150 are operated by users and OCR system operators, respectively.

An example user computing device 110 comprises a user interface 111, a camera module 113, a data storage unit 115, a communication application 117, and a digital wallet application 119.

In an example embodiment, the user interface 111 enables the user 101 to interact with the digital wallet application 119. For example, the user interface 111 may be a touch screen, a voice-based interface or any other interface that allows the user 101 to provide input and receive output from an application or module on the user computing device 110. In an example embodiment, the user 101 interacts with the camera module 113 via the user interface 111. For example, the user captures an image of a payment card 130 by actuating an object on the user interface 111 of the user computing device 110.

In an example embodiment, the camera module 113 comprises a module or function of the user computing device 110 that obtains a digital image. In other example embodiments, a camera device obtains or captures a digital image and transmits the image to the user computing device 110. The camera module 113 may be onboard the user computing device 110 or in any manner logically connected to the user computing device 110. The camera module 113 may be capable of obtaining individual images or a video scan. Any other suitable image capturing device may be represented by the camera module 113. In an example embodiment, the camera module 113 may control an associated camera device to capture an image or record a video of a payment card 130. In an example embodiment, the camera module 113 communicates with the digital wallet application 119 and/or the OCR system 140 to transmit the captured image of the payment card 130.

In an example embodiment, the data storage unit 115 comprises a local or remote data storage structure accessible to the user computing device 110 suitable for storing information. In an example embodiment, the data storage unit 115 stores encrypted information, such as HTML5 local storage. In an example embodiment, the data storage unit 115 stores financial account information associated with one or more payment cards 130 for use by the digital wallet application 119.

In an example embodiment, the user 101 can use a communication application 113, such as a web browser 114 application or a stand-alone shopping application 116, to view, download, upload, or otherwise access documents or web pages via a distributed network 120. In an example embodiment, the communication application 113 can interact with web servers or other computing devices connected to the network 120, including the user computing device 110 and a web server 143 associated with an OCR system 140.

In an example embodiment, the digital wallet application 119 is a program, function, routine, applet, or similar entity that exists on and performs its operations on the user computing device 110. In certain embodiments, the user 101 must install the digital wallet application 119 and/or make a feature selection on the user computing device 110 to obtain the benefits of the techniques described herein. In an example embodiment, the user 101 may access the digital wallet application 119 on the user computing device 110 via the user interface 111. In an example embodiment, the digital wallet application 119 can be selected by a user on the user computing device 110 and used to initiate a peer to peer transaction by a user. In another example embodiment, the digital wallet application 119 may be used in an online transaction by the user with a merchant system. In an example embodiment, the digital wallet application 119 is associated with the payment processing system 150 and communicates with the payment processing system 150 over the network 120.

In certain example embodiments, one or more functions herein described as performed by the digital wallet application 119 may also be performed by the payment processing system 150. In another example embodiment, one or more functions herein described as performed by the digital wallet application 119 may also be performed by the OCR system application module 143 associated with an OCR system 140. In certain example embodiments, one or more functions herein described as performed by the digital wallet application 119 may also be performed by the user computing device 110 operating system or a web browser application executing on the user computing device 110.

In an example embodiment, the user computing device 110 communicates with the OCR system 140 via the network 120.

An example OCR system 140 comprises an OCR system application module 143 and a data storage unit 147.

In an example embodiment, the OCR system application module 143 performs the functions of optical character recognition ("OCR") and visual object recognition for the OCR system 140. For example, OCR may comprise recognition of numbers, letters, symbols, and other characters on a payment card image and visual object recognition may comprise computer recognition of a logo on the payment card image. Visual object recognition may comprise recognition of logos associated with a payment card image. In an example embodiment, the OCR system comprises a database that is used to match extracted visual objects with a corresponding text description of the visual objects and retrieve the text descriptions. In an example embodiment, the OCR system 140 categorizes the payment card 130 based on OCR and visual object recognition. In an example, the OCR system 140 categorizes the payment card 130 as an open-loop payment card 130 or a closed-loop payment card 130. In another example, the OCR system 140 categorizes the payment card 130 as a credit payment card 130 or a non-credit payment card 130.

In an example embodiment, the data storage unit 147 comprises a local or remote data storage structure accessible to the OCR system 140 and/or OCR system application module 143 suitable for storing information. In an example embodiment, the data storage unit 147 stores encrypted information, such as HTML5 local storage. In an example embodiment, the data storage unit 147 is resident on the OCR system application module 143.

An example payment processing system 150 comprises a payment processing module 151 and data storage unit 155.

In an example embodiment, the payment processing module 151 processes a transaction initiated by a user using financial account information associated with a digital wallet account. In an example embodiment, the payment processing module 151 accesses financial account information selected by the user from the digital wallet account for use in the transaction. For example, the payment processing module 151 may receive a notification of a selection of the payment card from the user computing device 110 over the network 120 and may access the data storage unit 155 to retrieve financial account information associated with the payment card 130 selected by the user. In an example embodiment, the payment processing module communicates with a credit card processing system or a financial institution system over the network 120 to process the transaction. An example credit card processing system may comprise an issuer system and an acquirer system associated with a user credit card selected by the user for use in the transaction. An example financial institution system comprises a bank that is associated with a debit card selected by the user for use in the transaction. In an example embodiment, the payment processing module 151 generates a receipt and transmits the receipt to the user computing device 110. An example receipt may comprise a transaction summary comprising a list of the items purchased, a total amount for the transaction, the payment instrument used, the user's name, and/or other relevant or useful information associated with the transaction. In another example, the transaction is unsuccessful and the receipt comprises a statement that the transaction could not be completed or that the transaction has been canceled. In an example embodiment, the payment processing module 151 communicates with the OCR system 140. For example, the payment processing module 151 receives, from the OCR system 140, financial account information extracted via OCR from an image of a payment card 130 by the OCR system 140. In this example, the payment processing module 151 saves the received financial account information in the user's digital wallet account. In an example, the payment processing module 151 communicates with the digital wallet application 119 resident on the user computing device 110. For example, the payment processing module 151 receives a user selection of a payment card 130 from the user computing device 110 over the network 120 for use in a transaction.

In an example embodiment, the data storage unit 155 comprises a local or remote data storage structure accessible to the payment processing system 150 suitable for storing information. In an example embodiment, the data storage unit 155 stores encrypted information, such as HTML5 local storage. In an example embodiment, the data storage unit 155 stores financial account information associated with one or more payment cards 130 in a digital wallet account associated with a user. In an example embodiment, the payment processing system 150 receives the financial account information associated with the one or more payment cards from the OCR system 140. For example, the OCR system 140 analyzes one or more images of one or more payment cards 130 received from a user computing device 110 and extracts financial account information from the one or more images.

It will be appreciated that the network connections shown are example and other means of establishing a communications link between the computers and devices can be used. Additionally, those having ordinary skill in the art having the benefit of the present disclosure will appreciate that the user computing device 110, the OCR system 140, and the payment processing system 150 illustrated in FIG. 1 can have any of several other suitable computer system configurations. For example, a user computing device 110 embodied as a mobile phone or handheld computer may or may not include all the components described above.

Figure 6:
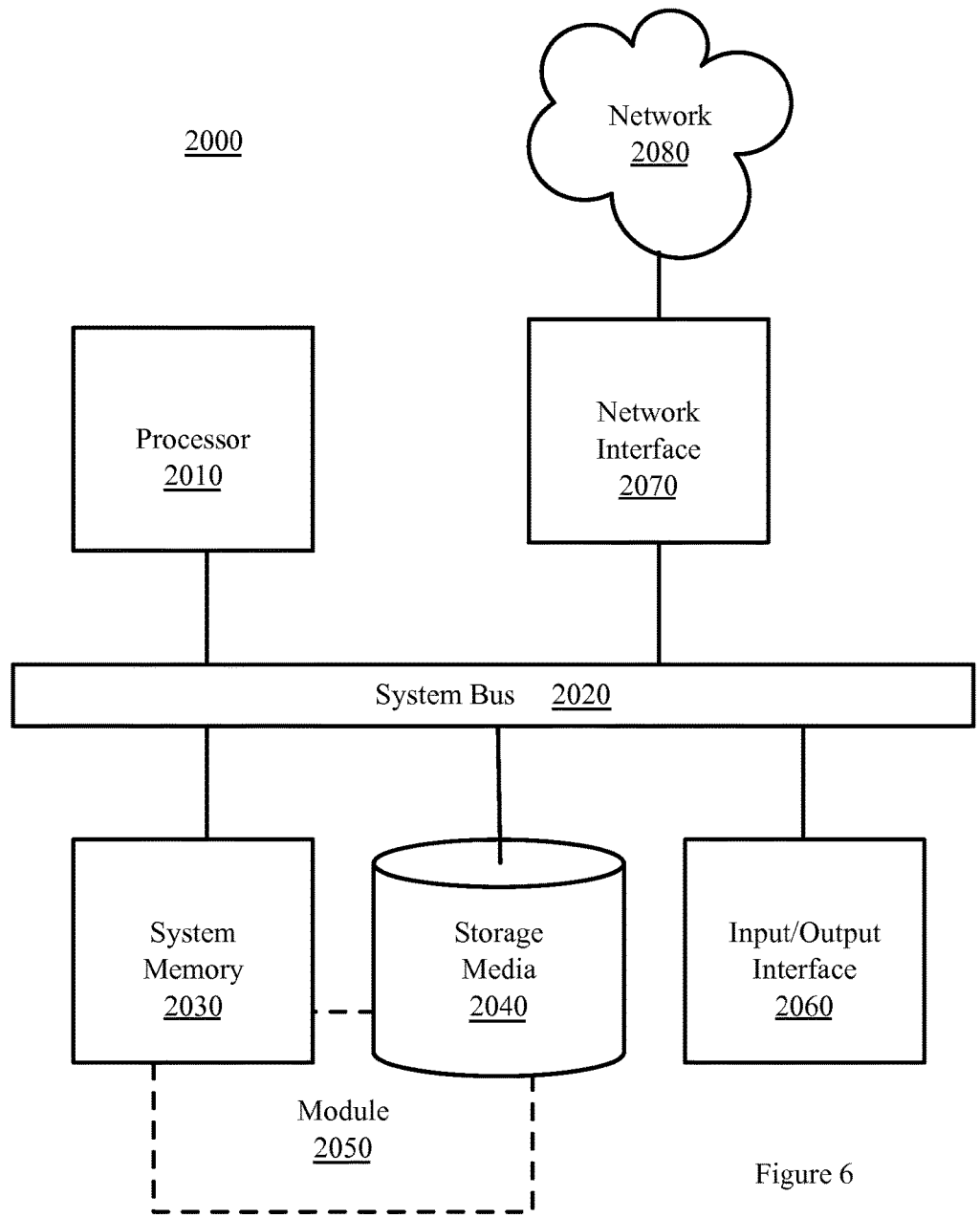
FIG. 6 is a block diagram depicting a computing machine and module, in accordance with certain example embodiments.

In example embodiments, the network computing devices and any other computing machines associated with the technology presented herein may be any type of computing machine such as, but not limited to, those discussed in more detail with respect to FIG. 6. Furthermore, any modules associated with any of these computing machines, such as modules described herein or any other modules (scripts, web content, software, firmware, or hardware) associated with the technology presented herein may be any of the modules discussed in more detail with respect to FIG. 6. The computing machines discussed herein may communicate with one another as well as other computer machines or communication systems over one or more networks, such as network 120. The network 120 may include any type of data or communications network, including any of the network technology discussed with respect to FIG. 6.

Example Processes

The example methods illustrated in FIGS. 3-6 are described hereinafter with respect to the components of the example operating environment 100. The example methods of FIGS. 3-6 may also be performed with other systems and in other environments.

Figure 3:
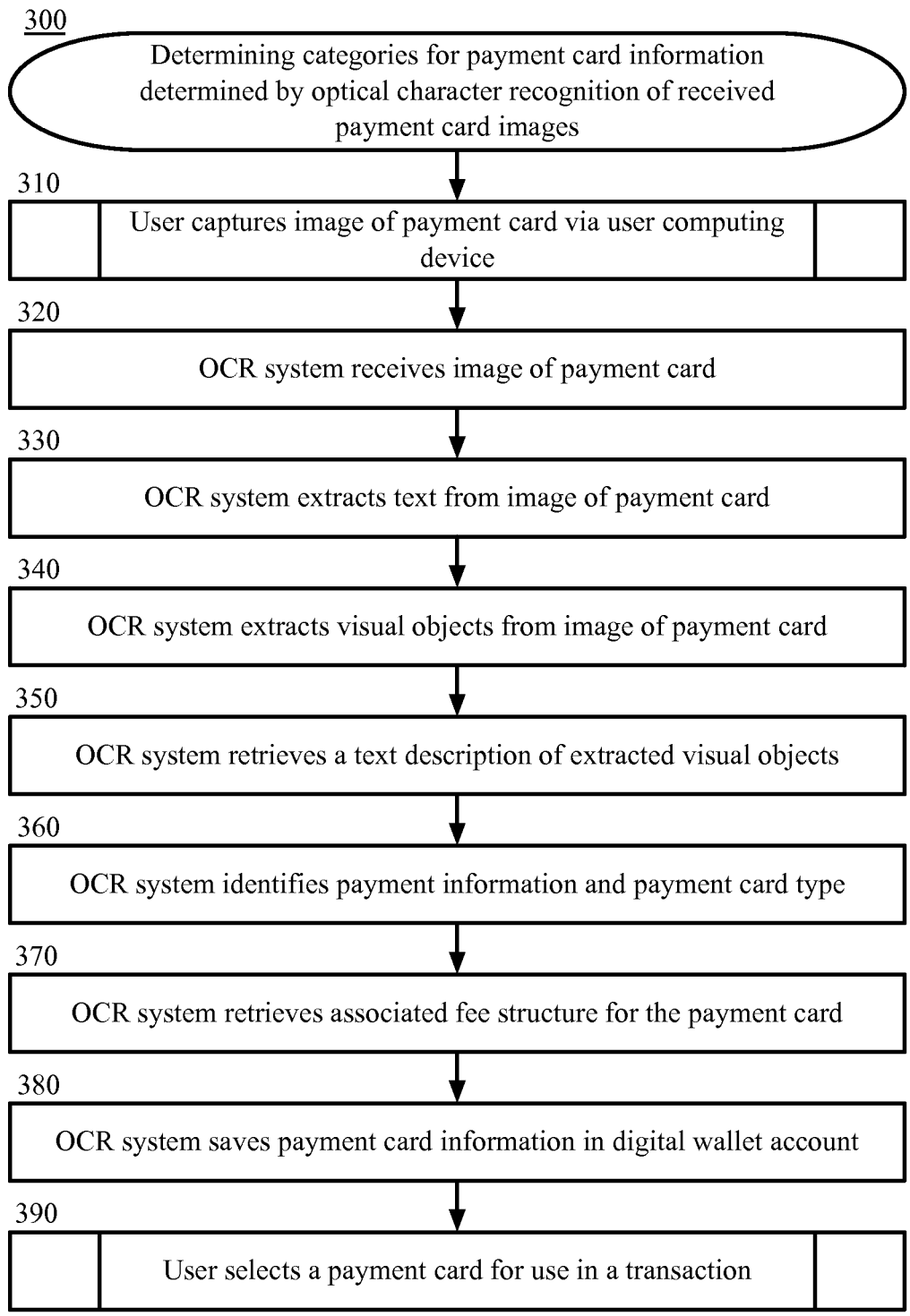
FIG. 3 is a block flow diagram depicting a method for determining categories for payment card information determined by optical character recognition of received payment card images, in accordance with certain example embodiments.

FIG. 3 is a block diagram depicting a method 300 for determining categories for payment card information determined by optical character recognition of received payment card images, in accordance with certain example embodiments. The method 300 is described with reference to the components illustrated in FIG. 1.

In block 310, a user captures an image of a payment card 130 via a user computing device 110. In certain example embodiments, the user desires to add financial account information associated with one or more payment cards 120 to a digital wallet application 119 resident on the user computing device 110 by capturing images of the one or more payment cards 120 via the user computing device 110.

The method for capturing an image of a payment card 130 is described in more detail hereinafter with reference to the method described in FIG. 4.

Figure 4:
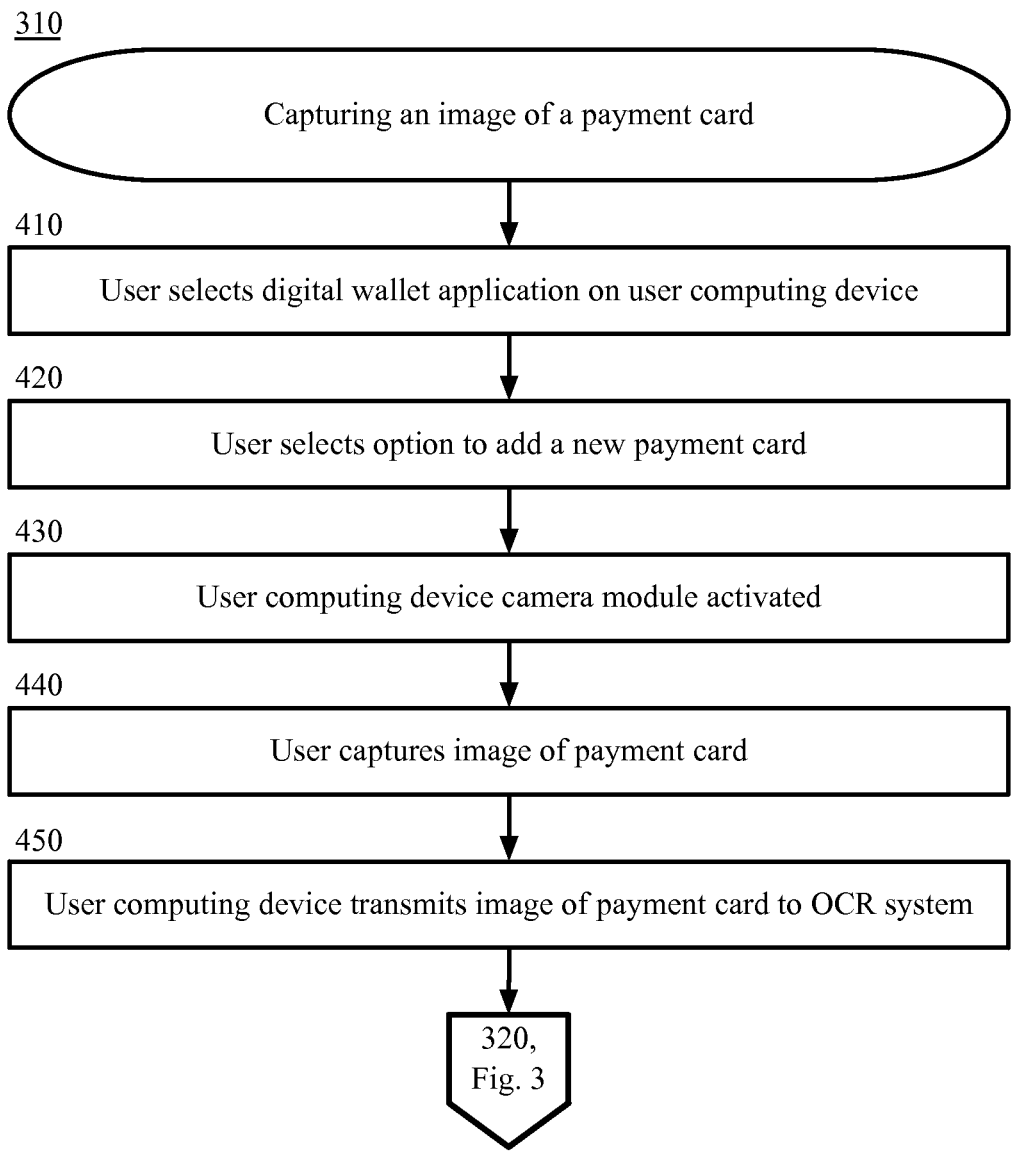
FIG. 4 is a block flow diagram depicting a method for capturing an image of a payment card, in accordance with certain example embodiments.

FIG. 4 is a block diagram depicting a method 310 for capturing an image of a payment card 130, in accordance with certain example embodiments. The method 410 is described with reference to the components illustrated in FIG. 1.

In block 410, the user selects the digital wallet application 119 on the user computing device 110. In an example embodiment, the digital wallet application 119 stores financial account information or has access to financial account information stored in the user computing device data storage unit 115. In an example embodiment, the digital wallet application 119 is associated with a payment processing system 150. In this example embodiment, the user establishes a digital wallet account with the payment processing system and the payment processing system communicates with the digital wallet application 119 over a network 120. The user may download the digital wallet application 119 onto the user computing device 110 from a website associated with the payment processing system after establishing the digital wallet account with the payment processing system. In the example embodiment, the user may add, delete, or edit personal information and/or financial account information via the digital wallet application 119, which communicates with the payment processing system.

In block 420, the user selects an option to add a new payment card 130. In an example embodiment, the digital wallet application 119 presents one or more objects on the user interface 111 of the user computing device 110 that enable the user to add, edit, organize, delete, or perform some other appropriate function with information in the user's digital wallet account. In an example embodiment, the user selects an option to add a new payment card 130 by capturing an image of the payment card. For example, the user actuates an object on the user interface 111 on the user computing device 110 to select an option that reads "add a new payment card by taking a picture."

In block 430, the user computing device camera module 113 is activated. In an example embodiment, the digital wallet application 119 communicates with the camera module 113 and/or the user computing device 110 operating system to activate the camera module 113. In an example embodiment, a camera device that communicates with the user computing device 110 is activated. In this example embodiment, the user computing device 110 may communicate with the camera device via a network 120. In another example embodiment, the user activates the camera module 113 or the camera device. In yet another example embodiment, the user does not activate the camera module 113 at this time, but has previously captured one or more images of a payment card 130 using the user computing device 110, wherein the user computing device 110 saved the one or more images on the data storage unit 115. In this example embodiment, the user selects the saved one or more images of the payment card 130 to add the new payment card 130 to the digital wallet application 119.

In block 440, the user captures an image of the payment card 130. In this example embodiment, the user may capture an image of the front of the payment card 130, an image of the back of the payment card 130, or one or more images of the front and/or the back of the payment card 130. In this example embodiment, the "front" of the payment card 130 may be identified as the side of the payment card 130 that lists the account number and/or a user's name on the payment card 130. In another example embodiment, the user does not capture an image of the payment card 130 at this time, but instead accesses a previously captured image of the payment card 130. For example, the camera module 113, digital wallet application 119, or user computing device 110 are used by the user to access one or more images of the payment card 130 saved in the data storage unit 115 resident on the user computing device 110. In certain example embodiments, a payment card 130 may comprise a credit card, a debit card, a stored value card, a gift card, a coupon, a voucher card, a rewards points card, a loyalty card, or other payment card 130 appropriate for use in a transaction. In this example, a transaction may comprise the purchase, exchange, return, or redemption of goods or services and may comprise transfers of funds, credits, points, or any other appropriate unit of value to or from a user financial account associated with the payment card 130.

In block 450, the user computing device 110 transmits the image of the payment card 130 to the OCR system 140. The optical character recognition ("OCR") system 140 may comprise an OCR system application module 143 that is capable of recognizing text and visual objects in an image. In another example embodiment, the user computing device 110 transmits two or more images of the payment card 130 to the OCR system 140. In an example embodiment, the user computing device 110 transmits one or more images of the payment card 130 over the network 120. In an example embodiment, the user computing device 110 transmits the one or more images of the payment card 130 to a payment processing system that comprises the OCR system 140. In an example embodiment, the user computing device 110, in addition to transmitting the one or more images of the payment card to the OCR system 140, also saves one or more copies of the one or more images of the payment card 130 in the data storage unit 115 resident on the user computing device 110. In another example embodiment, the user computing device 110 does not transmit the payment card image to the OCR system 140 and actions described herein as being performed by the OCR system 140 or OCR system application module 143 are performed by the digital wallet application 119 and/or the user computing device 110.

Returning to FIG. 3, in block 320, the OCR system 140 receives the image of the payment card 130. In an example embodiment, the OCR system 140 receives the image of the payment card 130 at the OCR system application module 143 via the network 120. In another example embodiment, the OCR system 140 otherwise receives the one or more images of the payment card 130.

In block 330, the OCR system 140 extracts text from the image of the payment card 130. In an example embodiment, the OCR system application module 143 extracts text from the image of the payment card 130 In another example embodiment, the OCR system application module 143 extracts texts from two or more images of the payment card 130. In an example embodiment, the OCR system application module 143 applies an optical character recognition ("OCR") algorithm to the payment card image to identify the information on the payment card. The OCR algorithm may represent any suitable process, program, method, or other manner of recognizing the digits or characters represented on the payment card image. In an example embodiment, the OCR algorithm may be customized to look for characters in particular locations on the image of the payment card 130, to look for a certain number of characters, or to look for certain combinations of characters. For example, it may be an industry standard for certain types of payment cards 130 to comprise a 15 or 16 numerical digit user account number in a certain location on the payment card 130, the user's name on a certain location on the payment card 130, and/or the expiration date of the payment card 130 on a certain location on the payment card. In an example, an expiration date may be in MM/DD/YYYY, MM/DD/YY, MM/YY, or MM/YYYY format, M representing a number associated with a month, D representing a number associated with a numerical day, and Y representing a number associated with a year. In an example embodiment, the OCR system application module 143 identifies each character and categorizes the groups of characters. For example, the OCR system application module 143 may determine that a group of characters comprise a name, account number, expiration date, and other suitable categories of data.

In block 340, the OCR system 140 extracts visual objects from the image of the payment card 130. In an example embodiment, the OCR system application module 143 extracts visual objects from the image of the payment card 130. The OCR system application module 143 may use any suitable algorithm, process, method, or other manner of recognizing card images. For example, the OCR system application module 143 may isolate visual objects, such as card art, within the image of the payment card 130 and can compare the visual object images to a stored database of images to identify matching images. For example, the payment card 130 may comprise a logo of a merchant system, issuer system, acquirer system, or financial institution associated the payment card 130. In addition to visual objects, the OCR system application module 143 may extract features of the payment card image, such as color, brightness, pattern, lines, shapes, shading, a holographic nature of an object, and/or other appropriate or relevant features of the payment card image.

In block 350, the OCR system 140 retrieves a text description of extracted visual objects. In an example embodiment, when the OCR system 140 or OCR system application module 143 compares the identified visual object to a database of images and locates a matching image, the OCR system 140 accesses stored data associated with the matching image comprising a text description of the visual object. In this example embodiment, the database of images may be resident on the data storage unit 147 of the OCR system application module 143. The data stored with the matching images may comprise an identification of the payment card 130 type. For example, the OCR system 140 may identify a logo on the payment card image that matches a logo in the database and retrieve a text description from the database that identifies the logo as pertaining to a particular bank, merchant system, issuer system, acquirer system, or other appropriate system associated with the payment card 130. An example text description of a visual object or logo may comprise the bank, merchant, issuer, or acquirer name. The text description may also comprise a specific type of payment card 130, such as credit card, gift card, or debit card. In an example embodiment, the OCR system 140 may populate the database with visual object images associated with a plurality of common payment card formats and create and associate text descriptions with these the visual object images. In certain example embodiments, the database of images may directly associate or otherwise correlate an image with the relevant information, in which case the text transition step may not be needed.

In block 360, the OCR system 140 identifies payment information and payment card 130 type. In an example embodiment, the OCR system 140 categorizes the payment card 130 into a category based on features comprising identified visual objects in the payment card image, extracted text from the visual card image, regions of color, shape, pattern, lines, shading, or brightness on the payment card 130, and/or other appropriate features of the payment card 130 that can be optically detected by the OCR system 140. For example, a category may comprise a debit card, a credit card, a gift card, a loyalty card, a reward points card, a coupon, a voucher, or any other appropriate category of payment card 130. For example, a credit card payment card 130 may be identified based on the presence of an issuer or acquirer name on the payment card image. In another example, a logo of a certain color, shape, and shading is detected in a certain position on the payment card 130 is searched in the OCR system application module 143 database and determined that the payment card 130 is a debit payment card 130. In another example, a bank issues both credit payment cards 130 and debit payment cards 130 with similar logos. In this example, the bank issues credit payment cards 130 comprising a first color scheme and debit payment cards 130 comprising a second color scheme.

In an example, the OCR system 140 extracts features from the payment card 130 image comprising a color scheme, text, or logo and searches for the color scheme, text, and/or logo in a database comprising features associated with payment cards 130. In an example, the OCR system 140 finds a match in the database to the logo identifying the logo and associating the logo with a merchant system and classifies the payment card 130 as a non-credit card based on the logo. In this example, the OCR system 140 knows that the merchant system does not issue credit cards. In another example, the OCR system 140 searches for the extracted text from the payment card 130 image in the database and finds that the text matches the name of an issuer system or an acquirer system in the database. In this example, the OCR system 140 categorizes the payment card 130 as a credit card based on the presence of an issuer system name or an acquirer name on the payment card 130 image. In yet another example, OCR system 140 searches the database for a color scheme and a logo extracted from the payment card 130 image and finds a card type or an issuer system associated with the extracted logo and the color scheme. For example, the database comprises a card type label, such as credit or non-credit, associated with one or more searchable features in the database. For example, the card type label associated with two features comprising the extracted logo and extracted color scheme comprises a label reading "non-credit card" and the OCR system 140 categorizes the payment card 130 as a non-credit card based on the card type label in the database.

Figure 2:
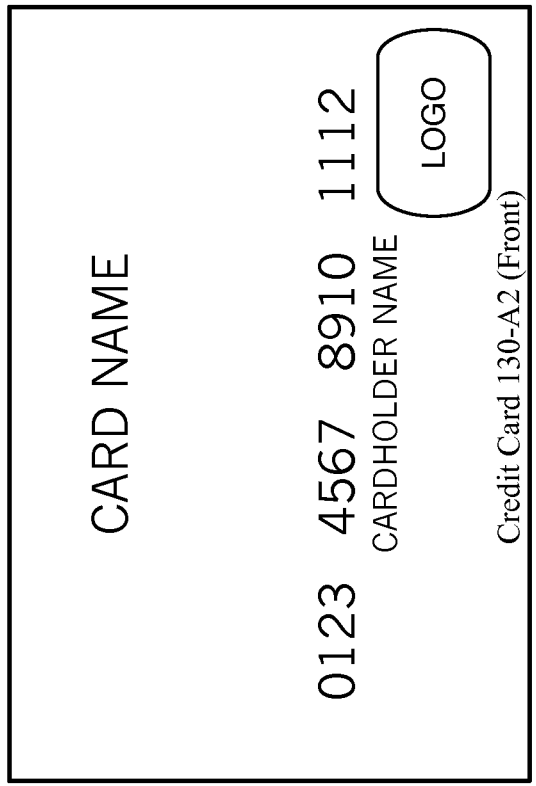
FIG. 2 is an example illustration of a debit card and a credit card, in accordance with certain example embodiments.
Figure 2:
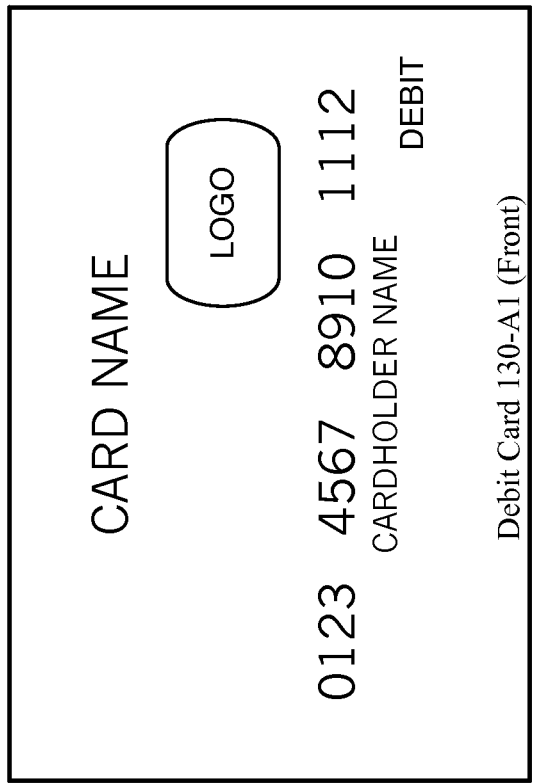

FIG. 2 is an example illustration of an example debit card 130-A1 and an example credit card 130-A2, in accordance with certain example embodiments. The purpose of this illustration is to illustrate example methods of identifying differences between debit cards, credit cards, and other categories of payment cards 130. Credit cards, debit cards, and other categories of payment cards 130 may comprise a variety of formats. For example, the positioning of a logo may be standardized in the payment card 130 industry, facilitating an identification of a credit card. In yet another example, an OCR system 140 may identify a credit card based on the number of digits or arrangement of digits on an account number displayed on an image of the payment card 130. For example, the OCR system 140 identifies the number and arrangement of digits in a payment card 130 via OCR text recognition. In this example, the OCR system 140 accesses a database comprising payment card types associated with the number and arrangement of digits on a payment card 130. For example, the database lists credit cards issued by issuer A as comprising sixteen digits arranged in four sets of four numbers, credit cards issued by issuer B as comprising seventeen digits arranged in one set of five numbers followed by three sets of four numbers, and credit cards issued by issuer C as comprising 15 digits. In this example, the OCR system determines that there are 15 numbers on the payment card 130 image via OCR recognition and determines that the payment card 130 is a credit card issued by issuer C by searching the database and finding an entry in the database associating 15 digit payment cards with issuer C credit cards. Other features of payment cards 130 (and their resulting captured images) such as color, shape, pattern, lines, shading, brightness, or other optically distinguishable features may also applicable in distinguishing between a credit card and other types of payment cards 130.

In certain example embodiments, the OCR system 140 identifies an issuer system or acquirer system associated with the payment card 150 based on OCR text recognition of the payment card image and text description of visual objects. For example, the OCR system 140 searches for one or more extracted visual objects in a database comprising text descriptions associated with one or more extracted visual objects. In this example, the OCR system 140 extracts the text description from the database associated with the one or more extracted visual objects. For example a text description associated with a certain logo may read, "Issuer A logo" and the OCR system 140 identifies Issuer A as the issuer system associated with the payment card 130 based on the text description in the database associated with the extracted logo. In these example embodiments, the OCR system 140, to identify the category of the payment card 130, may access a database comprising a list of issuer/acquirer names and a corresponding list of standard formats for credit cards, debit cards, or other payment cards 130 associated with the issuer/acquirer system name. In this example embodiment, the OCR system 140 searches for the issuer system name or acquirer system name in the database and finds a match between the searched features and finds the list of standard formats for credit cards, debit cards, or other payment cards 130 associated with the issuer/acquirer system name. For example the one or more standard formats may comprise features such as visual objects and text that may be identified and extracted via OCR. In this example embodiment, the OCR system 140 may compare the one or more standard formats with features extracted via OCR by the OCR system 140 from the payment card 130 image. For example, the OCR system 140 identifies the payment card 130 as associated with Issuer A based on searching the database for a match of the text description of a visual object. In this example, the database shows that the standard format for Issuer A credit cards is a blue background with a yellow logo in the foreground and that the standard format for Issuer A debit cards is a red background with a yellow logo in the foreground. In this example, the OCR system 140 extracted features from the payment card 130 comprising a red background and a yellow logo in the foreground. In this example, the OCR system 140 identifies a match between the standard format for issuer A debit cards as described in the database and the extracted features from the payment card 130 and identifies the payment card 130 as a debit card issued by issuer A.

Returning to FIG. 3, in block 370, the OCR system retrieves an associated fee structure for the payment card 130. In an example embodiment, the OCR system 140 accesses the associated fee structure for the payment card 130 from a database or table in the data storage unit 147 that associates fee structures with payment cards 130. In an example embodiment, the OCR system retrieves the fee structure from the database or table based on the issuer/acquirer name and payment card 130 type identified from OCR text recognition or the retrieved text description of visual objects. In an example embodiment, the associated fee structure for a payment card 130 associated with a particular issuer system identifies the specific value of transaction fees associated with a payment card 130 associated with a particular payment card 130 issuer. For example, the issuer system may charge a payment processing system transaction fees comprising a percentage of the total amount spent by the user in a transaction or a fixed fee per transaction. In another example embodiment, the associated fee structure identifies that there are one or more transaction fees associated with the payment card 130 associated with the issuer system but does not specifically identify the numerical or percentage value of the transaction fees. In yet another example embodiment, the OCR system 140 retrieves the fee structure from the table based on a general payment card 130 type identified from OCR recognition or the retrieved text description of visual objects. In this example, the OCR system 140 did not identify the issuer/acquirer name associated with the payment card 130 but identified the payment card 130 type as a credit card. In this example, the associated fee structure in the database shows that transaction fees associated with credit cards generally fall within a certain range. In certain example embodiments, the OCR system 140 extracts or otherwise retrieves the associated fee structure from the database.

In block 380, the OCR system 140 saves payment card 130 information in the digital wallet account. In an example embodiment, the OCR system 140 communicates with the payment processing system associated with the digital wallet application to save the payment card information in the digital wallet account on the payment processing system and/or the digital wallet application on the user computing device 110. In an example embodiment, the OCR system 140 is part of the payment processing system. In an example embodiment, the OCR system 140 transmits the payment card information captured from the card image to the digital wallet application module 119 on the user computing device 110. Example payment card information may comprise a user's name (as it appears on the payment card 130), a financial account number extracted from the payment card 130, an expiration date associated with the payment card 130, an image of the payment card 130, and any other useful or appropriate information associated with the payment card 130 or the user's financial account.

In block 390, the user selects a payment card 120 for use in a transaction. The method for selecting a payment card 130 to use for a digital wallet transaction is described in more detail hereinafter with reference to the method described in FIG. 5.

Figure 5:
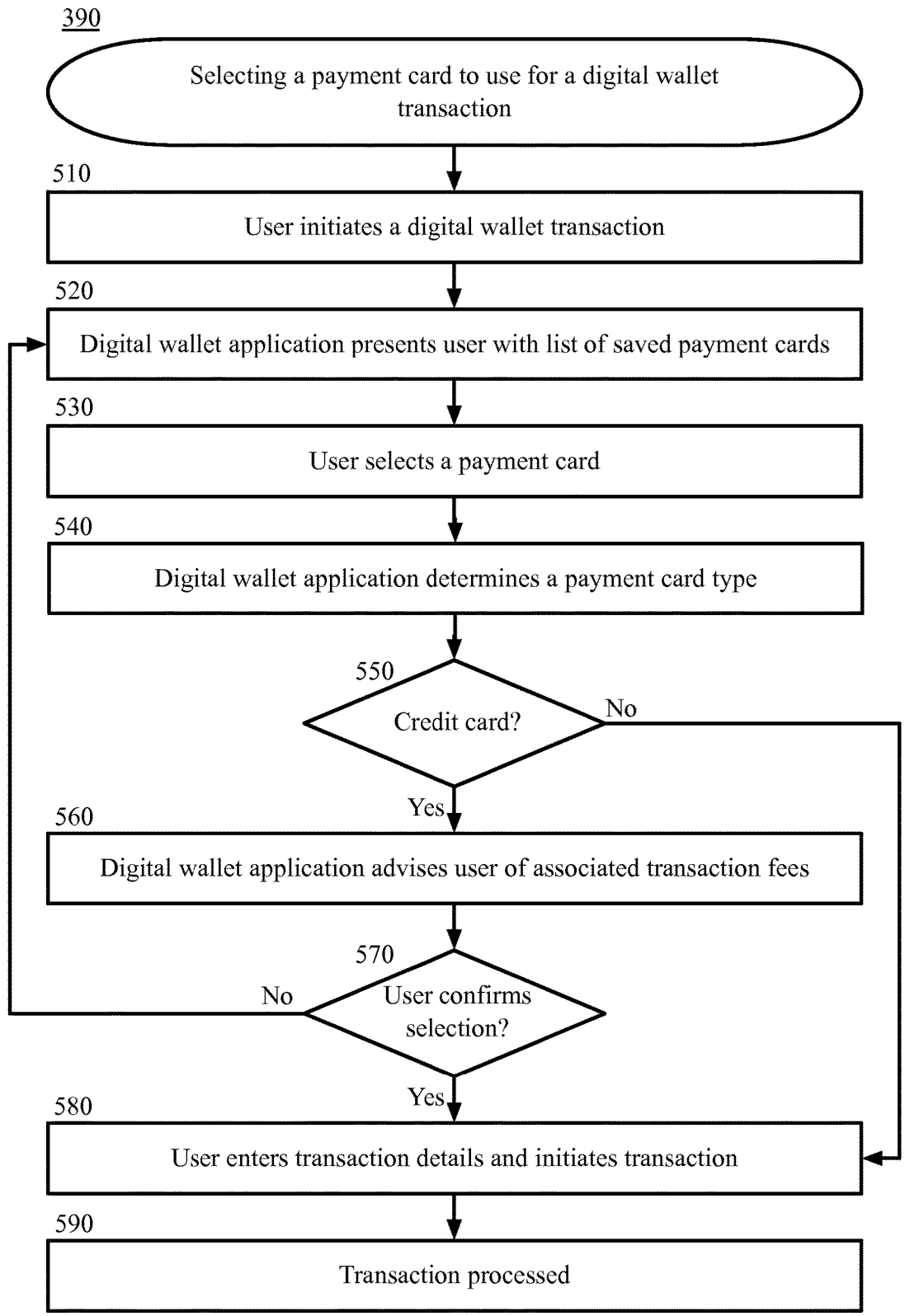
FIG. 5 is a block flow diagram depicting a method for selecting a payment card to use for a digital wallet transaction, in accordance with certain example embodiments.

FIG. 5 is a block diagram depicting a method 390 for selecting a payment card 130 to use for a digital wallet transaction, in accordance with certain example embodiments. The method 390 is described with reference to the components illustrated in FIG. 1.

In block 510, the user initiates a digital wallet transaction. In an example embodiment, the user desires to initiate a peer to peer ("P2P") transaction with another user having a digital wallet account with the payment processing system. In an example embodiment, the user selects the digital wallet application 119 on the user computing device 110. In this example embodiment, the user selects an option to initiate a P2P transaction using the digital wallet account. In an example, the user actuates one or more objects on the user interface 111 to initiate the P2P transaction. An example P2P transaction comprises a transfer of funds from the user to a payee. In an example embodiment, the user selects a payee for the P2P transaction via the digital wallet application 119. In other example embodiments, the user initiates a digital wallet transaction with a merchant system for the purchase of a product or a service. For example, the user accesses a merchant system website via a web browser on the user computing device 110, selects one or more items for purchase, and initiates a transaction on the merchant system website by actuating an object on the user interface 111.

In block 520, the digital wallet application 119 presents the user with a list of saved payment cards 130. In an example embodiment, the digital wallet application 119 is associated with a payment processing system comprising a digital wallet account associated with the user. In an example embodiment, the digital wallet application 119 communicates with the payment processing system to access financial account information stored in the digital wallet account. In an example embodiment, the digital wallet application 119 stores financial account information associated with one or more payment cards 150 in the data storage unit 115 of the user computing device 110. In certain example embodiments, a payment card 130 may comprise a credit card, a debit card, a stored value card, a gift card, a coupon, a voucher card, a rewards points card, a loyalty card, or other payment card 130 appropriate for use in a transaction.

In block 530, the user selects a payment card 130. In an example embodiment, the user actuates an object on the user interface 111 to select the payment card 130. For example, the user 101 selects a debit card from the list of payment cards 130. In another example, the user 101 selects a credit card from the list of payment cards 130.

In block 540, the digital wallet application 119 determines a payment card 130 type. In an example embodiment, the digital wallet application 119 receives a determination of a payment card type from the OCR system 140 and/or the payment processing system 150. In an example embodiment, the OCR system 140 determines a payment card type associated with the payment card 130 in response to user selection of the payment card for use in the transaction and then transmits the determination of the payment card 130 type to the digital wallet application 119 and/or the payment processing system 150. For example, the user computing device 110 communicates the user selection to the OCR system 140 along with one or more images of the payment card 130. In this example embodiment, the OCR system 140 determines the payment card type based on optical character recognition and visual object recognition of the one or more images captured of the payment card 130 and communicates the card type to the digital wallet application 119 or to the digital wallet account associated with the digital wallet application 119. An example payment card type classification scheme is "credit card" vs. "non-credit card."

In another example embodiment, the OCR system 140 previously identified the payment card 130 card type. For example, the OCR system 140 previously identified the card as either a credit card or another type of payment card 130 in response to the user selecting an option on the digital wallet application 119 to add a payment card 130 and capturing an image of the payment card 130 via the camera module 113. In this example, the digital wallet application 119 received a determination from the OCR system 140 that the payment card 130 is of the "credit card" type and saves the payment type associated with the payment card 130 on the user computing device 110. In this example, in response to the user selecting the payment card 130 for use in a transaction, the digital wallet application 119 retrieves the stored payment type associated with the payment card 130 and therefore determines that the payment card 130 is a credit card. The method for categorizing a payment card using OCR and object recognition on an image of the payment card is described in more detail hereinafter with reference to the method described in FIG. 7.

In block 550, the digital wallet application 119 determines whether the payment card 130 is a credit card or a non-credit card. If the digital wallet application 119 determines that the payment card 130 is not a credit card, the method 390 proceeds to block 580. In another example embodiment, the digital wallet application 119 receives a determination from the OCR system 140 of the payment card 130 type and determines that the payment card 130 is not a credit card based on the received determination of the payment card 130 type.

In block 580, the user enters transaction details and initiates the transaction. For example, the user may enter shipping information if the transaction is the purchase of a product. In an example embodiment, the user initiates the transaction by selecting an object on the user interface 111. For example, the user selects a user interface 111 object on a touchscreen interface that reads "confirm transaction."

Returning to block 550, if the OCR system 140 determines that the payment card 130 is a credit card, the method 390 proceeds to block 560.

In block 560, the digital wallet application advises the user of associated transaction fees. For example, the OCR system 140 retrieved a fee structure associated with a credit card payment card 130 and transmitted the fee structure to the payment processing system associated with the user's digital wallet account. In this example, the payment processing system associates the fee structure with the credit card payment card 130 in the digital wallet account. In an example embodiment, in response to the user selecting the credit card payment card 130, the digital wallet application, communicating with the payment processing system, receives the fee structure associated with the selected credit card. In an example embodiment, the digital wallet application extracts or identifies the transaction fees associated with the credit card from the fee structure and displays the fee structure to the user on the user computing device 110. For example, the digital wallet application displays a message that reads, "credit card A, 2.5% transaction fee" to advise the user that the credit card issuer charges a 2.5% per transaction fee to process the transaction.

In block 570, the user either confirms the selection of the credit card or selects an option to select another payment card 130. In an example embodiment, the digital wallet application 119 presents the user with an option on the user interface 111 to select an interface object to confirm the selection of the credit card and an interface object to select another payment card 130. In an example embodiment, the digital wallet application 119 and/or the payment processing system associated with the digital wallet application 119 receives an indication of a user confirmation of the credit card. In another example embodiment, the user is presented with a third option to cancel the transaction. In an example embodiment, the digital wallet application 119 and/or the payment processing system associated with the digital wallet application 119 receives an indication of a user selection to cancel the transaction. In this example embodiment, in response to receiving the indication of the selection to cancel the transaction, the payment processing system cancels the transaction.

In certain example embodiments, the payment processing system retrieves a fee structure associated with a second payment card 130 in the user's digital wallet account that has lower transaction fees than the first payment card 130 initially selected by the user. In an example embodiment, the payment processing system, in addition to presenting the fee structure associated with the first payment card, presents the fee structure associated with the second payment card 130. In this example embodiment, the digital wallet application 119 displays an option on the user interface 111 for the user to select the second payment card for use in the transaction.

If the user selects an option to select another payment card, the method 390 returns to block 520. For example, the user selects an object on the user interface 111 to select another payment card 130. In an example embodiment, the digital wallet application 119 and/or the payment processing system associated with the digital wallet application 119 receives an indication of a user selection of an option to select another payment card for use in the transaction. For example, the user selects a non-credit payment card 130 from the digital wallet application 119 by actuating a user interface 111 object. In an example embodiment, the payment processing system processes a transaction between the user and an online website using the financial account information associated with the non-credit payment card 130.

In another example embodiment, the user selects an object on the user interface 111 to confirm a suggestion received from the payment processing system to confirm the use of a second payment card 130 having lower transaction fees than the payment card 130 initially selected by the user. In this example embodiment, the payment processing system receives an indication of the user selection of the option to use the second payment card 130 the transaction. In this example embodiment, the payment processing system communicates with the merchant system and/or the issuer system to process the transaction using financial account information stored in the user's digital wallet account and associated with the second payment card 130.

In yet another example embodiment, the user selects an object on the user interface 111 to initiate a P2P transaction between the user and a payee having a digital wallet account associated with the payment processing system. For example, the user may enter transaction details comprising a transaction total and select a payee account associated with the payment processing system. For example, the payee account comprises a digital wallet account associated with the payment processing system. In this example embodiment, the payment processing system associated with the digital wallet account and/or the digital wallet application 119 receives an indication of the user selection of the option to initiate a P2P transaction. In this example embodiment, the payment processing system may receive transaction details entered by the user and/or the payee.

Returning to block 570, if the user confirms the selection of the credit card, the method 390 proceeds to block 580.

In block 580, the user enters transaction details and initiates the transaction. In an example embodiment, the user initiates the transaction by selecting an object on the user interface 111. For example, the user selects a user interface 111 object on a touchscreen interface that reads "confirm transaction."

In block 590, the transaction is processed. In an example embodiment, the payment processing system processes a transaction using a credit card selected by a user. In an example embodiment, the payment processing system and/or the digital wallet application 119 communicates financial account information associated with the payment card 130 selected by the user to the merchant system for processing. For example, the digital wallet application 119 communicates the financial account information via a Bluetooth, Wi-Fi, or near field communication ("NFC") network to a merchant point of sale device in proximity to the user computing device 110. In another example, the payment processing system communicates the financial account information via the network 120 to the merchant system website associated with the merchant system. In this example embodiment, the merchant system processes the transaction using the financial account information received from the payment processing system and selected by the user. In another example embodiment, the payment processing system communicates directly with an issuer system associated with the payment card 130 selected by the user to process the transaction.

In another example embodiment, the payment processing system processes a transaction using a non-credit card selected by the user. For example, the payment processing system communicates with applicable systems to process a transaction involving a debit card, a store card, a gift card, or other non-credit payment card 130. In certain example embodiments, the payment processing system associated with the digital wallet account and the digital wallet application 119 processes a P2P transaction based on the financial account information associated with the credit payment card 130. In an example embodiment, the transaction comprises a transfer of funds to or from a user financial account associated with the payment card 130. For example, a P2P transaction involves the transfer of funds between the user financial account and a second user financial account of another user having a digital wallet account associated with the payment processing system. In another example, the transaction comprises a transfer of funds between the user financial account associated with the payment card 130 and a merchant system account. In another example embodiment, the payment processing system or a merchant system process a transaction between the user and an online website using the financial account information associated with the credit payment card 130. In an example embodiment, the payment processing system processes the P2P transaction initiated by the user by transferring funds from the user digital wallet account to an digital wallet account associated with the payee selected by the user. For example, a P2P transaction involves the transfer of funds between the user financial account and a second user financial account of another user having a digital wallet account associated with the payment processing system. In an example embodiment, the payment processing system does not incur fees or extra costs for processing a P2P transaction.

Other Example Embodiments

FIG. 6 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with an opportunity or option to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the scope of the following claims, which are to be accorded the broadest interpretation so as to encompass such alternate embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method to select payment cards for use in transactions, comprising:
    receiving, by one or more computing devices and from a user computing device, an image of a first payment card, the payment card comprising one or more visual objects, one or more text objects, and one or more visual features;
    recognizing, by the one or more computing devices, the one or more text objects and the one or more visual objects in the image of the first payment card;
    extracting, by the one or more computing devices, the one or more recognized text objects and the one or more recognized visual objects from the image of the first payment card;
    retrieving, by the one or more computing devices and for each of the extracted one or more visual objects, a text description corresponding to the extracted one or more visual objects;
    determining, by the one or more computing devices, based on the one or more extracted text objects, the one or more retrieved text descriptions corresponding to the extracted one or more visual objects, and one or more visual features of the first payment card image, a categorical designation for the first payment card, the categorical designation comprising an issuer system identifier and a payment card type;
    receiving, by the one or more computing devices and from the user computing device, a request to process a transaction and a first input of a selection of the first payment card for use in the transaction;
    in response to receiving the request to process the transaction and the first input of the selection of the first payment card for use in the transaction, retrieving, by the one or more computing devices, a fee structure associated with the issuer system for the payment card type, wherein the fee structure identifies one or more specific values of one or more associated transaction fees specified by the issuer system for the determined payment card type;
    transmitting, by the one or more computing devices and to the user computing device, the retrieved fee structure and a request for a second input selecting a second payment card other than the selected first payment card, wherein the fee structure and the request are displayed via the user computing device;
    receiving, by the one or more computing devices and from the user computing device, an input of a selection of the second payment card at a time after transmitting the retrieved fee structure and the request for the second input selecting the second payment card other than the selected first payment card; and
    processing, by the one or more computing devices, the transaction using financial account information associated with the selected second payment card.

2. The method of claim 1, further comprising:
    receiving, by the one or more computing devices and from the user computing devices, a second image comprising an image of the second payment card;
    extracting, by the one or more computing devices, one or more text objects and one or more visual objects from the second image; and
    retrieving, by the one or more computing devices and for each of the extracted one or more visual objects from the second image, a text description corresponding to the extracted one or more visual objects.

3. The method of claim 1, wherein the user computing device captures the image of the first payment card using a camera device communicating with the user computing device.

4. The method of claim 1, wherein the one or more visual features comprise color, brightness, pattern, lines, shapes, shading, a holographic nature of an object, or other appropriate or relevant features of the first payment card image.

5. A computer program product, comprising:
    a non-transitory computer-readable storage device having computer-executable program instructions embodied thereon that when executed by a computer cause the computer to select payment cards for use in transactions, the computer-executable instructions comprising:
        computer-executable program instructions to extract one or more text objects and one or more visual objects from one or more images of a first payment card;
        computer-executable program instructions to retrieve, for each of the extracted one or more visual objects, a text description corresponding to the extracted one or more visual objects;
        computer-executable program instructions to determine, based on the one or more extracted text objects and the one or more retrieved text descriptions corresponding to the extracted one or more visual objects, a categorical designation for the first payment card, the categorical designation comprising an issuer system identifier and a payment card type;

computer-executable program instructions to receive, from the user computing device, a request to process a transaction and a first input of a first selection of the first payment card for use in the transaction;

computer-executable program instructions to retrieve, in response to receiving the request to process the transaction and the first input of the selection of the first payment card for use in the transaction, a fee structure associated with the issuer system for the payment card type, wherein the fee structure identifies one or more specific values of one or more associated transaction fees specified by the issuer system for the determined payment card type;

computer-executable program instructions to transmit, to the user computing device, the retrieved fee structure and a request for a second input selecting a second payment card other than the selected first payment card, wherein the fee structure and the request are displayed via the user computing device;

computer-executable program instructions to receive, from the user computing device, an input of a selection of the second payment card at a time after transmitting the retrieved fee structure and the request for the second input selecting the second payment card other than the selected first payment card; and computer-readable program instructions to process the transaction using financial account information associated with the selected second payment card.

6. The computer program product of claim 5, further comprising, computer-readable program instructions to receive, from the user computing device, one or more images of the first payment card.

7. The computer program product of claim 6, wherein the user computing device captures the image of the first payment card via a camera device communicating with the user computing device.

8. The computer program product of claim 5, wherein determining a categorical designation for the first payment card is further based on one or more visual features of the first payment card image, the one or more visual features comprising one or more of color, brightness, pattern, lines, shapes, shading, a holographic nature of an object, or other appropriate or relevant features of the first payment card image.

9. A system to select payment cards for use in transactions, comprising:
a storage device; and
a processor communicatively coupled to the storage device, wherein the processor executes application code instructions that are stored in the storage device to cause the system to:
extract one or more text objects and one or more visual objects from one or more images of a first payment card;
retrieve, for each of the extracted one or more visual objects, a text description corresponding to the extracted one or more visual objects;
determine, based on the one or more extracted text objects and the one or more retrieved text descriptions corresponding to the extracted one or more visual objects, a categorical designation for the first payment card, the categorical designation comprising an issuer system identifier and a payment card type;

receive, from the user computing device, a request to process a transaction and a first input of a selection of the first payment card for use in the transaction;

in response to receiving the request to process the transaction and the first input of the selection of the first payment card for use in the transaction, retrieve a fee structure associated with the issuer system for the payment card type, wherein the fee structure identifies one or more specific values of one or more associated transaction fees specified by the issuer system for the determined payment card type;

transmit, to the user computing device, the retrieved fee structure and a request for a second input selecting a second payment card other than the selected first payment card, wherein the fee structure and the request are displayed via the user computing device;

receive, from the user computing device, an input of a selection of the second payment card at a time after transmitting the retrieved fee structure and the request for the second input selecting the second payment card other than the selected first payment card; and process the transaction associated with the received request using financial account information associated with the selected second payment card.

10. The system of claim 9, wherein the processor is further configured to execute application code instructions that are stored in the storage device to cause the system to receive, from a user computing device, one or more images of the first payment card.

11. The system of claim 9, wherein the processor is further configured to execute application code instructions that are stored in the storage device to cause the system to:
determine, based on the one or more extracted text objects and the one or more retrieved text descriptions corresponding to the extracted one or more visual objects, a categorical designation for the first payment card as a credit payment card.

12. The system of claim 11, wherein the processor is further configured to execute application code instructions that are stored in the storage device to cause the system to:
receive, from the user computing device, one or more images of the second payment card;
extract one or more text objects and one or more visual objects from the received one or more images of the second payment card; and
retrieve, for each of the extracted one or more visual objects, a text description corresponding to the extracted one or more visual objects.

13. The system of claim 10, wherein the user computing device captures the image of the first payment card via a camera device communicating with the user computing device.

14. The system of claim 9, wherein determining a categorical designation for the first payment card as a credit card is further based on one or more visual features of the first payment card image, such as color, brightness, pattern, lines, shapes, shading, a holographic nature of an object, or other appropriate or relevant features of the first payment card image.

* * * * *